US012703305B2

(12) United States Patent
Gasevski et al.

(10) Patent No.: US 12,703,305 B2
(45) Date of Patent: Aug. 11, 2026

(54) VEHICLE REAR STEP AND DIFFUSER SYSTEM

(71) Applicant: FCA US LLC, Auburn Hills, MI (US)

(72) Inventors: Lou Gasevski, West Bloomfield, MI (US); Arturo Guzman-Magana, LaSalle (CA); Rimon I Ghobrial, Clawson, MI (US); Mark Coletti, Birmingham, MI (US); Jon M Francis, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 291 days.

(21) Appl. No.: 18/389,851

(22) Filed: Dec. 20, 2023

(65) Prior Publication Data

US 2024/0217441 A1 Jul. 4, 2024

Related U.S. Application Data

(60) Provisional application No. 63/478,383, filed on Jan. 4, 2023.

(51) Int. Cl.
*B60R 3/02* (2006.01)

(52) U.S. Cl.
CPC .................................... *B60R 3/02* (2013.01)

(58) Field of Classification Search
CPC ........... B60R 3/02; B60R 19/48; B60R 3/007; B62D 35/02; B62D 35/007; B62D 37/02; B62D 33/0273
See application file for complete search history.

(56) References Cited

U.S. PATENT DOCUMENTS 3,716,254 A * 2/1973 Tarvin ...................... B60R 3/02 280/166
7,377,563 B1 * 5/2008 Demick .................. B60R 19/48 280/166
8,882,176 B2 * 11/2014 Froling .................. B62D 35/02 296/180.1
9,963,076 B1 * 5/2018 Bender ..................... B60R 3/02
10,562,456 B2 * 2/2020 Lynch ....................... B60R 3/02
10,589,804 B2 * 3/2020 Del Gaizo ........... B62D 35/007
(Continued)

FOREIGN PATENT DOCUMENTS

DE 102013101296 A1 * 8/2014 ........... B62D 35/007
DE 102013105843 A1 * 12/2014 ............ B62D 37/02
(Continued)

*Primary Examiner* — James A Shriver, II
*Assistant Examiner* — Ian Bryce Shelton
(74) *Attorney, Agent, or Firm* — Jeremy J. Klobucar

(57) ABSTRACT

A deployable rear step and diffuser system for a vehicle having a frame and a rear bumper or fascia includes a rear step and diffuser configured to slidably couple to the frame at a rear of the vehicle and including a lower diffuser surface and an upper step surface. An actuator is operably coupled to and configured to move the rear step and diffuser between (i) a retracted position where the rear step and diffuser is nested beneath the vehicle, and (ii) a deployed position where the rear step and diffuser extends outwardly from a rear of the vehicle such that the lower diffuser surface functions as a diffuser to reduce drag and smooth airflow around the vehicle, and the upper step surface provides a user stepping surface to facilitate access to a cargo area of the vehicle.

19 Claims, 4 Drawing Sheets

(56) References Cited

U.S. PATENT DOCUMENTS

| | | | | |
|---|---|---|---|---|
| 10,814,790 | B2 * | 10/2020 | Meszaros | B60R 3/02 |
| 11,299,097 | B1 * | 4/2022 | McCready | B60R 3/02 |
| 11,351,942 | B2 * | 6/2022 | Knutsen | B60R 19/48 |
| 11,458,900 | B2 * | 10/2022 | Watson | B60R 3/002 |
| 11,541,949 | B2 * | 1/2023 | Beierl | B62D 35/007 |
| 11,772,722 | B2 * | 10/2023 | Iorga | B62D 35/02 296/180.5 |
| 11,891,126 | B2 * | 2/2024 | Moradnia | B62D 35/007 |
| 11,926,286 | B2 * | 3/2024 | Leitner | B60R 3/02 |
| 11,987,209 | B2 * | 5/2024 | Glickman | B60D 1/01 |
| 2014/0097638 | A1 * | 4/2014 | Froling | B62D 35/02 296/180.1 |
| 2019/0337577 | A1 * | 11/2019 | Del Gaizo | B62D 35/007 |
| 2019/0389386 | A1 * | 12/2019 | Meszaros | B60R 3/005 |
| 2020/0001793 | A1 * | 1/2020 | Lynch | B60R 19/48 |
| 2020/0339039 | A1 * | 10/2020 | Watson | B60R 3/002 |
| 2020/0361389 | A1 * | 11/2020 | Leitner | B60R 3/02 |
| 2021/0347318 | A1 * | 11/2021 | Knutsen | B60R 19/24 |
| 2022/0314888 | A1 * | 10/2022 | Glickman | B62D 33/0273 |
| 2023/0069094 | A1 * | 3/2023 | Moradnia | B62D 35/007 |
| 2023/0365202 | A1 * | 11/2023 | Lindberg | B62D 35/007 |
| 2023/0373398 | A1 * | 11/2023 | Bird | B60R 3/02 |

FOREIGN PATENT DOCUMENTS

| | | | | | |
|---|---|---|---|---|---|
| DE | 102013105842 | B4 | | 3/2022 | |
| EP | 3177510 | A1 | | 6/2017 | |
| EP | 3357800 | A1 | * | 8/2018 | B62D 37/02 |
| KR | 20150129254 | A | * | 11/2015 | B62D 37/02 |

* cited by examiner

VEHICLE REAR STEP AND DIFFUSER SYSTEM

CROSS REFERENCE TO RELATED APPLICATION

This application claims the benefit of U.S. Provisional Pat. App. No. 63/478,383, filed Jan. 4, 2023, the contents of which are incorporated herein by reference thereto.

FIELD

The present application relates generally to vehicle systems and, more particularly, to a vehicle with a deployable rear step and diffuser.

BACKGROUND

With the current shift towards battery electric vehicles (BEVs), extending vehicle range while reducing range anxiety is a top priority. However, poor vehicle aerodynamics may potentially adversely affect vehicle range, particularly during highway driving. Moreover, pickup trucks typically include a truck bed accessible via a tailgate. However, due to the height of the truck bed relative to the ground, it may be difficult for an individual to access the truck bed without assistance. Thus, while conventional systems work for their intended purpose, it is desirable to provide continuous improvement in the relevant art to provide greater vehicle range and utility.

SUMMARY

In accordance with one example aspect of the invention, a deployable rear step and diffuser system for a vehicle having a frame and a rear bumper or fascia is provided. In one example implementation, the system includes a rear step and diffuser configured to slidably couple to the frame at a rear of the vehicle and including a lower diffuser surface and an upper step surface. An actuator is operably coupled to and configured to move the rear step and diffuser between (i) a retracted position where the rear step and diffuser is nested beneath the vehicle, and (ii) a deployed position where the rear step and diffuser extends outwardly from a rear of the vehicle such that the lower diffuser surface functions as a diffuser to reduce drag and smooth airflow around the vehicle, and the upper step surface provides a user stepping surface to facilitate access to a cargo area of the vehicle.

In addition to the foregoing, the described system may include one or more of the following features: wherein the actuator is configured to selectively rotate the deployed rear step and diffuser to various angles relative to a horizontal to control wake separation; wherein the deployed rear step and diffuser is rotatable to approximately 16° from the horizontal; wherein the rear step and diffuser further includes first and second extension beams configured to couple to the frame; and wherein the actuator includes a motor, a damper operably coupled to the motor, and an actuator arm coupled between the damper and one of the first or second extension beams, wherein the motor is configured to extend and retract the actuator arm to deploy and retract the rear step and diffuser.

In addition to the foregoing, the described system may include one or more of the following features: wherein the damper is configured to rotatably couple to the frame, and wherein the motor is configured to selectively rotate the damper to thereby rotate the deployed rear step and diffuser to various angles relative to a horizontal to control wake separation; wherein the actuator comprises a first actuator coupled to the first extension beam, and a second actuator coupled to the second extension beam; wherein the upper step surface includes a first stepping surface disposed between a pair of outer second stepping surfaces; and wherein the first stepping surface is disposed at an elevation lower than the outer second stepping surfaces to provide various step heights.

In accordance with another example aspect of the invention, a vehicle is provided. In one example implementation, the vehicle includes a frame, a rear bumper or fascia, and a deployable rear step and diffuser system. The rear step and diffuser system includes a rear step and diffuser slidably coupled to the frame proximate the rear bumper or fascia, and including a lower diffuser surface and an upper step surface. An actuator is operably coupled to and configured to move the rear step and diffuser between (i) a retracted position where the rear step and diffuser is nested beneath the vehicle, and (ii) a deployed position where the rear step and diffuser extends outwardly from a rear of the vehicle such that the lower diffuser surface functions as a diffuser to reduce drag and smooth airflow around the vehicle, and the upper step surface provides a user a stepping surface to improve access to a cargo area of the vehicle.

In addition to the foregoing, the described vehicle may include one or more of the following features: wherein the actuator is configured to selectively rotate the deployed rear step and diffuser to various angles relative to a horizontal to control wake separation; wherein the deployed rear step and diffuser is rotatable to approximately 16° from the horizontal; wherein the rear step and diffuser further includes first and second extension beams coupled to the frame; and wherein the actuator includes a motor, a damper operably coupled to the motor, and an actuator arm coupled between the damper and one of the first or second extension beams, wherein the motor is configured to extend and retract the actuator arm to deploy and retract the rear step and diffuser.

In addition to the foregoing, the described vehicle may include one or more of the following features: wherein the damper is rotatably coupled to the frame, and wherein the motor is configured to selectively rotate the damper to thereby rotate the deployed rear step and diffuser to various angles relative to a horizontal to control wake separation; wherein the actuator comprises a first actuator coupled to the first extension beam, and a second actuator coupled to the second extension beam; wherein the upper step surface includes a first stepping surface disposed between a pair of outer second stepping surfaces; wherein the first stepping surface is disposed at an elevation lower than the outer second stepping surfaces to provide various step heights; and wherein the vehicle is a pickup truck and the cargo area is a cargo bed.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, it is important to optimize aerodynamics of battery electric vehicles (BEVs) to extend vehicle range and reduce range anxiety. Additionally, it may be difficult to access a truck bed of the BEV by conventional means such as fixed side steps. Accordingly, the systems described herein provide improved aerodynamic features to reduce drag and improve aerodynamics of the vehicle, resulting in increased range and performance. The improved aerodynamic features advantageously also improve truck bed accessibility.

In one example, the improved aerodynamic features include a powered deployable rear step and diffuser system configured to reduce drag by smoothing out airflow around the vehicle. The rear step and diffuser system includes one or more actuators and a rear step with a flat underside that lines up with the underbody of the vehicle. Having the active rear step with a flat underside provides the ability to use it as a diffuser for flow control and wake closure. The deploying nature of the feature provides improved airflow while maintaining departure angle and styling, for example, at lower speeds. The adjustable rear step also provides a user a step surface to facilitate reaching a truck bed of the vehicle.

As described, the powered rear step includes a flat underside that acts as a diffuser. One or more actuators are configured to extend and lower the rear step at predetermined speeds, which with a determined angle configured to close the wake, reduces drag and extends vehicle range. The powered rear step is located on the underside rear end of the vehicle and provides the ability to manipulate and manage airflow and use it as a diffuser for flow control and wake closure. The powered rear step is also adjustable when parking or at idle to achieve a desired ground clearance and departure angle to avoid obstacles. In this way, the improved aerodynamic features of the rear step and diffuser system enables the vehicle to achieve improved aerodynamic performance to extend vehicle range and/or improve fuel/power economy.

Figure 1:
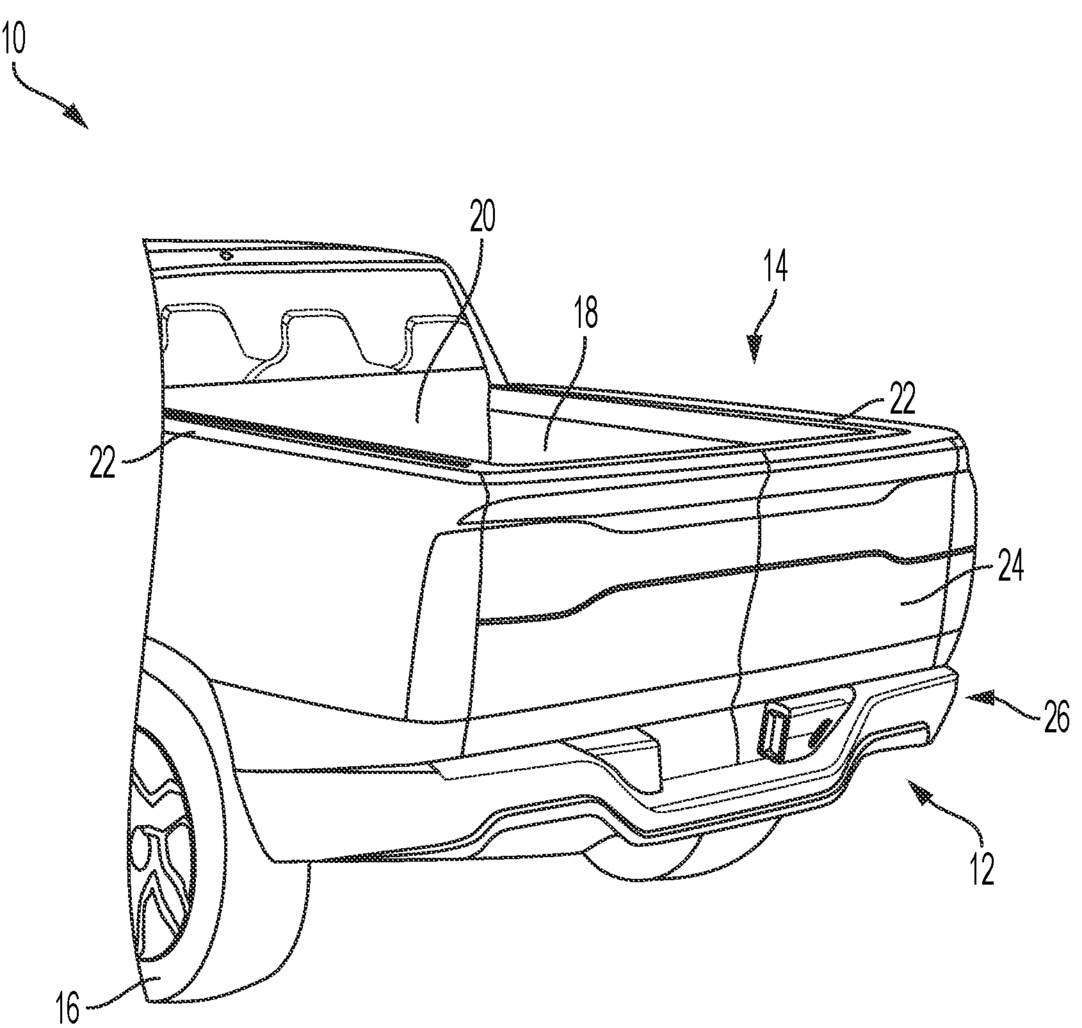
FIG. 1 is a rear perspective view of a vehicle with an example rear step and diffuser system, in a retracted position, in accordance with the principles of the present application.

With reference now to FIG. 1, a vehicle 10 with an example powered deployable rear step and diffuser system 12 is illustrated in accordance with the principles of the present invention. In the example embodiment, the vehicle 10 is a pickup truck having a storage bed 14 located above one or more rear wheels 16. In alternative arrangements, vehicle 10 may be a vehicle having a cargo area above the rear wheels 16 and a closure member, such as a sport utility vehicle with a rear cargo area and a rear hatch. The storage bed 14 provides a cargo area 18 at least partially defined by a floor (not shown), a forward wall 20, side walls 22, and a tailgate 24.

Figure 2:
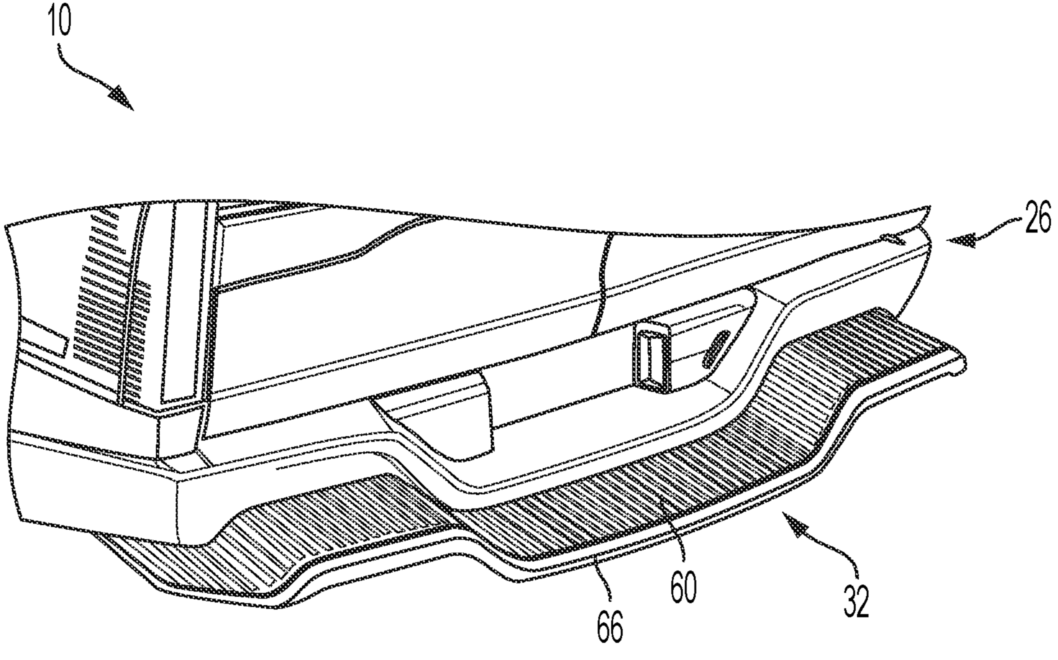
FIG. 2 is a rear perspective view of the rear step and diffuser system, in a deployed position, in accordance with the principles of the present application.
Figures 3A, 3B:
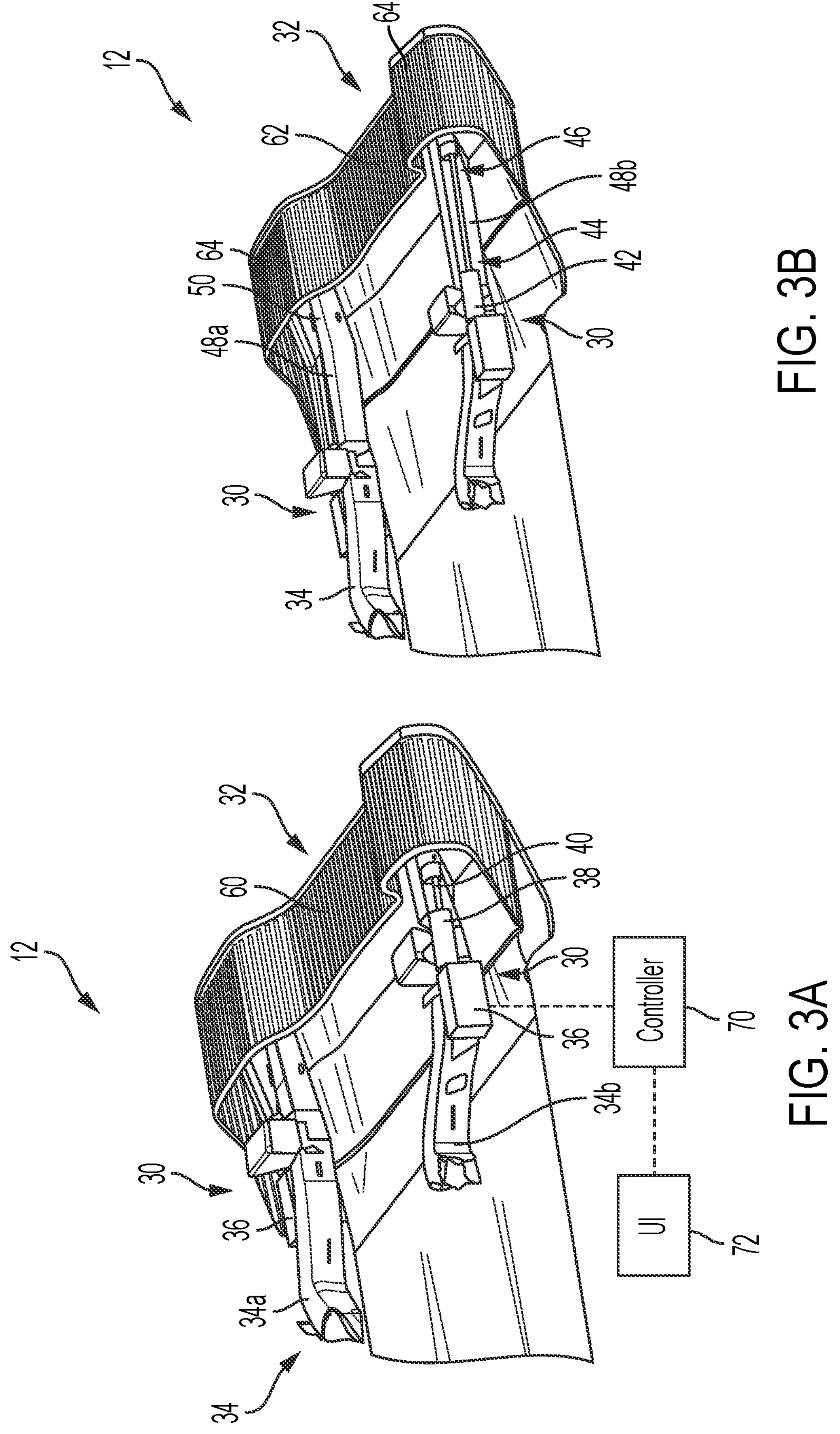
FIG. 3A is a perspective view of the rear step and diffuser system, in the retracted position, in accordance with the principles of the present application.
FIG. 3B is a perspective view of the rear step and diffuser system of FIG. 3A, in the deployed position, in accordance with the principles of the present application.
Figure 4B:
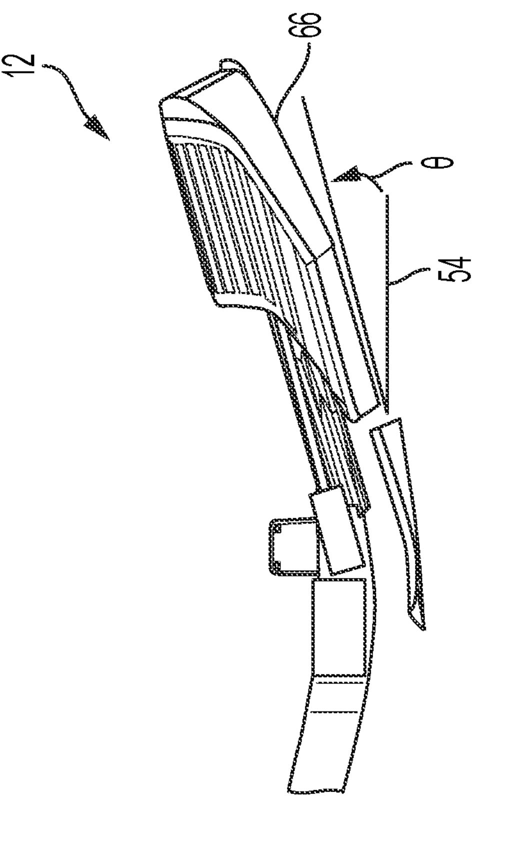
FIG. 4B is a side view of the rear step and diffuser system of FIG. 4A, in an angled position, in accordance with the principles of the present application.

With additional reference to FIGS. 2 and 3A, in the example embodiment, the powered deployable rear step and diffuser system 12 generally includes one or more actuators 30 and a rear step/diffuser 32, which is located beneath the vehicle proximate a rear bumper/fascia 26 of the vehicle 10. As described herein in more detail, the actuator 30 is operably coupled to and is configured to move the rear step/diffuser 32 between a stowed position (FIGS. 1, 3A), a deployed position (FIGS. 2, 3B), and a deployed and angled position (FIG. 4B).

In the example embodiment, the actuator 30 is coupled to a fixed portion of an underbody of the vehicle 10 such as, for example, a frame 34. In the example implementation, the system 12 includes a pair of actuators 30 each coupled to one of a pair of opposed frame members 34*a*, 34*b*. Each actuator 30 includes a servo motor 36 operably coupled to a damper 38 with a retractable actuator link or arm 40. In one example, the damper 38 is configured to absorb forces from small impact events on the rear step/diffuser 32 with objects such as a wall or another vehicle. With additional reference to FIG. 3B, the damper 38 is rotatably coupled to the frame member 34 about a pivot point 42, which enables the actuator 30 to move the rear step/diffuser 32 to the angled position (FIG. 4B). The actuator arm 40 includes a proximal end 44 slidably connected to the damper 38, and a distal end 46 coupled to one of a pair of opposed extension beams 48*a*, 48*b*.

As shown in FIGS. 3A and 3B, the extension beams 48*a*, 48*b* are slidably coupled to and/or supported by the frame members 34*a*, 34*b*. A distal end 50 of each extension beam 48*a*, 48*b* is coupled to and supports the rear step/differ 32. In this way, the actuators 30 are configured to extend the actuator arms 40 outwardly to thereby move the extension beams 48*a*, 48*b* in a direction away from the rear of the vehicle 10, to deploy the rear step/diffuser 32, as shown in FIG. 3B. Moreover, the servo motors 36 are configured to rotate the dampers 38 to move the rear step/diffuser 32 to an upwardly angled position, as shown in FIG. 4B.

Generally, in the stowed or retracted position, the rear step/diffuser 32 is nested beneath the vehicle and integrated with the rear bumper/fascia 26. In the deployed position, the rear step/diffuser 32 extends outwardly from a rear of the vehicle 10. While driving, particularly at highway speeds, the deployed rear step/diffuser 32 is shaped and positioned to improve vehicle aerodynamics by reducing wake turbulence and drag (pressure) and generating downward force at the vehicle underbody. When the vehicle 10 is stationary, the deployed rear step/diffuser 32 provides an upper surface 60 to be used as a step for a user to reach the rear cargo area 18, as a seat for a user, as a surface to hold objects (e.g., tools), or the like. In the example embodiment, the upper step surface 60 is a continuous surface having a first or lower step surface 62 disposed between a pair of second or outboard step surfaces 64 to provide stepping surfaces at different heights. It will be appreciated, however, that upper step surface 60 may have any suitable shape, number of steps, step height, etc.

In general vehicle design, the rear of the vehicle and the surfaces on the top, sides, and under the vehicle are used to control a vehicle wake separation, which is an unsteady chaotic flow that occurs during driving that typically experiences a negative static pressure that can lead to added drag. In the example embodiment, a lower surface 66 of the deployed rear step/diffuser 32 is configured to provide for a controlled wake separation. As such, with the rear step/diffuser 32, the unsteady flow may now be separated in a controlled manner by generating a positive pressure on the rear of the vehicle 10, resulting in drag reduction. In the example embodiment, the actuators 30 are configured to move the rear step/diffuser 32 to any position between the fully stowed/retracted position (FIG. 3A) to the fully deployed position (FIG. 3B) to establish a desired wake separation. In one example, the fully deployed position is 350 mm or approximately 350 mm, but it will be appreciated that the fully deployed position may be any suitable distance that enables the rear step and diffuser system 12 to function as described herein.

Figure 4A:
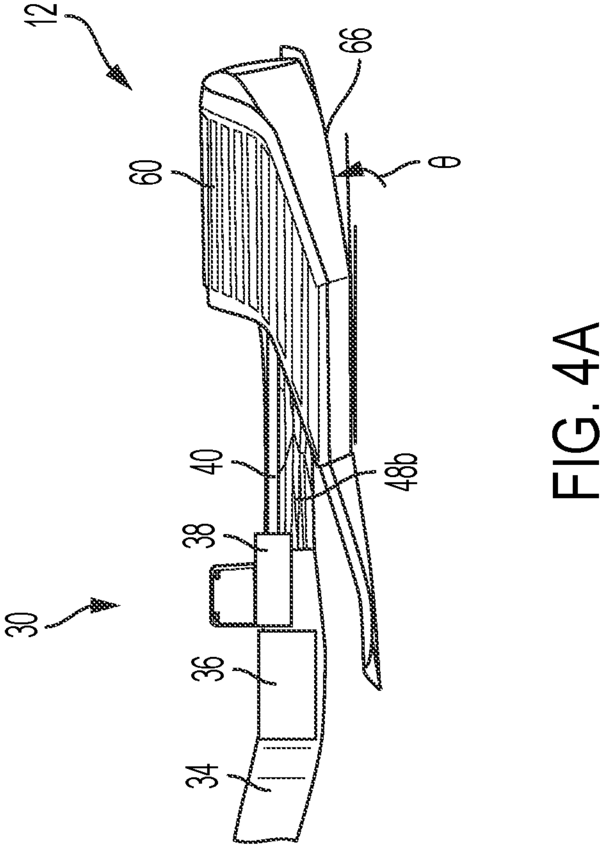
FIG. 4A is a side view of the rear step and diffuser system, in the deployed position, in accordance with the principles of the present application.

Moreover, as shown in FIGS. 4A and 4B, when in the deployed position, the actuator 30 is configured to rotate the dampers 38 to thereby rotate the extension beams 48*a*, 48*b* and thus the rear step/diffuser 32 to further control vehicle aerodynamics. By varying the angle of the rear step/diffuser 32, it is possible to further control the wake separation, for example when the vehicle has a bed cap or tool boxes, as the wake can behave differently when such objects are present. Another advantage of the angled rear step/diffuser 32 is that a high angle of orientation allows for downward force if the vehicle is driving at high speeds (e.g. on a track).

As such, the actuators 30 are configured to move the rear step/diffuser 32 to any angled position between a base angle position (FIG. 4A) to a fully angled position (FIG. 4B) to establish a desired wake separation. In one example, the base angle position has an angle 'θ' of 1° or approximately 1° from the horizontal 54, and the fully angled position has an angle 'θ' of 16° or approximately 16° from the horizontal 54. However, it will be appreciated that angle 'θ' may be any suitable angle that enables the rear step and diffuser system 12 to function as described herein.

In operation, a vehicle controller 70 (FIG. 3A) is in signal communication with the actuators 30 for control thereof. The vehicle controller 70 may also be in signal communication with a user interface 72 such as, for example, a switch or a touchscreen display disposed within the vehicle 10. The user interface 72 is configured to receive input from a user to selectively deploy and optionally angle the rear step/diffuser 32. In other examples, the controller 70 is configured to automatically adjust, deploy, and angle the rear step/diffuser 32 when various conditions occur such as, for example, at various vehicle speeds.

Described herein are systems and methods for controlling airflow around a vehicle and providing assistance to reach a cargo area of a vehicle. The system is a powered and deployable rear step and diffuser system that includes an actuator and a rear step and diffuser. The actuator moves the rear step and diffuser between a stowed or retracted position that is nested beneath the vehicle, and a deployed position extending outwardly from a rear of the vehicle. In the deployed position, the rear step and diffuser provides a lower diffuser surface to facilitate controlling airflow around the vehicle, and an upper step surface to assist a user in reaching the vehicle cargo area. As such, the system advantageously provides a retractable dual-purpose step and diffuser feature.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A deployable rear step and diffuser system for a vehicle having a frame and a rear bumper or fascia, the system comprising:

a rear step and diffuser configured to slidably couple to the frame at a rear of the vehicle and including a lower diffuser surface and an upper step surface; and an actuator operably coupled to and configured to move the rear step and diffuser between (i) a retracted position where the rear step and diffuser is nested beneath the vehicle, and (ii) a deployed position where the rear step and diffuser extends outwardly from the rear of the vehicle such that the lower diffuser surface functions as a diffuser to reduce drag and smooth airflow around the vehicle, and the upper step surface provides a user stepping surface to facilitate access to a cargo area of the vehicle.

2. The system of claim 1, wherein the actuator is configured to selectively rotate the deployed rear step and diffuser to various angles relative to a horizontal to control wake separation.

3. The system of claim 2, wherein the deployed rear step and diffuser is rotatable to approximately 16° from the horizontal.

4. The system of claim 1, wherein the rear step and diffuser further includes first and second extension beams configured to couple to the frame.

5. A deployable rear step and diffuser system for a vehicle having a frame and a rear bumper or fascia, the system comprising:

a rear step and diffuser configured to slidably couple to the frame at a rear of the vehicle and including a lower diffuser surface and an upper step surface; and an actuator operably coupled to and configured to move the rear step and diffuser between (i) a retracted position where the rear step and diffuser is nested beneath the vehicle, and (ii) a deployed position where the rear step and diffuser extends outwardly from the rear of the vehicle such that the lower diffuser surface functions as a diffuser to reduce drag and smooth airflow around the vehicle, and the upper step surface provides a user stepping surface to facilitate access to a cargo area of the vehicle, wherein the rear step and diffuser further includes first and second extension beams configured to couple to the frame, and wherein the actuator comprises:
a motor;
a damper operably coupled to the motor; and
an actuator arm coupled between the damper and one of the first or second extension beams,
wherein the motor is configured to extend and retract the actuator arm to deploy and retract the rear step and diffuser.

6. The system of claim 5, wherein the damper is configured to rotatably couple to the frame, and wherein the motor is configured to selectively rotate the damper to thereby rotate the deployed rear step and diffuser to various angles relative to a horizontal to control wake separation.

7. The system of claim 4, wherein the actuator comprises a first actuator coupled to the first extension beam, and a second actuator coupled to the second extension beam.

8. The system of claim 1, wherein the upper step surface includes a first stepping surface disposed between a pair of outer second stepping surfaces.

9. The system of claim 8, wherein the first stepping surface is disposed at an elevation lower than the outer second stepping surfaces to provide various step heights.

10. A vehicle comprising:
a frame;
a rear bumper or fascia; and
a deployable rear step and diffuser system, comprising:
a rear step and diffuser slidably coupled to the frame proximate the rear bumper or fascia, and including a lower diffuser surface and an upper step surface; and
an actuator operably coupled to and configured to move the rear step and diffuser between (i) a retracted position where the rear step and diffuser is nested beneath the vehicle, and (ii) a deployed position where the rear step and diffuser extends outwardly from a rear of the vehicle such that the lower diffuser surface functions as a diffuser to reduce drag and smooth airflow around the vehicle, and the upper step surface provides a user a stepping surface to improve access to a cargo area of the vehicle.

11. The vehicle of claim 10, wherein the actuator is configured to selectively rotate the deployed rear step and diffuser to various angles relative to a horizontal to control wake separation.

12. The vehicle of claim 11, wherein the deployed rear step and diffuser is rotatable to approximately 16° from the horizontal.

13. The vehicle of claim 10, wherein the rear step and diffuser further includes first and second extension beams coupled to the frame.

14. The vehicle of claim 13, wherein the actuator comprises:
a motor;
a damper operably coupled to the motor; and
an actuator arm coupled between the damper and one of the first or second extension beams,
wherein the motor is configured to extend and retract the actuator arm to deploy and retract the rear step and diffuser.

15. The vehicle of claim 14, wherein the damper is rotatably coupled to the frame, and wherein the motor is configured to selectively rotate the damper to thereby rotate the deployed rear step and diffuser to various angles relative to a horizontal to control wake separation.

16. The vehicle of claim 13, wherein the actuator comprises a first actuator coupled to the first extension beam, and a second actuator coupled to the second extension beam.

17. The vehicle of claim 10, wherein the upper step surface includes a first stepping surface disposed between a pair of outer second stepping surfaces.

18. The vehicle of claim 17, wherein the first stepping surface is disposed at an elevation lower than the outer second stepping surfaces to provide various step heights.

19. The vehicle of claim 10, wherein the vehicle is a pickup truck and the cargo area is a cargo bed.

* * * * *